US012762427B2

(12) United States Patent
Ben-Itzhak et al.

(10) Patent No.: US 12,762,427 B2
(45) Date of Patent: Oct. 13, 2026

(54) LEARNING QUANTIZATION LEVELS

(71) Applicant: VMware, Inc., Palo Alto, CA (US)

(72) Inventors: Yaniv Ben-Itzhak, Pardes Hana-Karkur (IL); Shay Vargaftik, Haifa (IL)

(73) Assignee: VMware LLC, Palo Alto, CA (US)

( * ) Notice: Subject to any disclaimer, the term of this patent is extended or adjusted under 35 U.S.C. 154(b) by 789 days.

(21) Appl. No.: 18/160,529

(22) Filed: Jan. 27, 2023

(65) Prior Publication Data

US 2024/0256893 A1 Aug. 1, 2024

(51) Int. Cl.
*G06N 3/098* (2023.01)

(52) U.S. Cl.
CPC .................................... *G06N 3/098* (2023.01)

(58) Field of Classification Search
CPC ........ G06N 3/098; G06N 3/045; G06N 3/063; G06N 3/084
See application file for complete search history.

(56) References Cited

U.S. PATENT DOCUMENTS

| | | | | |
|---|---|---|---|---|
| 2021/0158216 | A1* | 5/2021 | Du | G06N 20/00 |
| 2022/0245527 | A1* | 8/2022 | Choi | G06N 20/20 |
| 2024/0070518 | A1* | 2/2024 | Ferreira | G06N 20/00 |

FOREIGN PATENT DOCUMENTS

| | | | | |
|---|---|---|---|---|
| WO | WO-2022003562 A1 * | 1/2022 | | G06N 3/084 |

OTHER PUBLICATIONS

Shlezinger, et al., "Deep Task-Based Quantization", Entropy, 2021.
Arvinte, et al., "Deep Learning-Based Quantization of L-Values for Gray-Coded Modulation", IEEE Globecom Workshops (GC Wkshps), 2019, IEEE.
Suresh, et al., "Distributed Mean Estimation with Limited Communication", International Conference on Machine Learning, 2017, PMLR, vol. 70.
Caldas, et al., "Expanding the Reach of Federated Learning by Reducing Client Resource Requirements", Dec. 2018, arXiv.
Safaryan, et al., "Uncertainty Principle for Communication Compression in Distributed and Federated Learning and the Search for an Optimal Compressor", Information and Inference: A Journal of the IMA, Jan. 2021, vol. 11, Issue 2, pp. 557-580.

(Continued)

*Primary Examiner* — Andrew L Tank
*Assistant Examiner* — Humaira Zahin Mauni
(74) *Attorney, Agent, or Firm* — Kim & Stewart LLP

(57) ABSTRACT

A method of reducing data transmission between neural networks in a distributed or federated learning environment, includes the steps of: training a quantization neural network by using a plurality of training vectors each having a dimension k, wherein the quantization neural network is configured to, based on said training, output quantization levels for approximating input vectors having the dimension k; after training the quantization neural network, randomly sampling coordinates of a vector having a dimension d, to provide a first set of k coordinates, wherein d is greater than k; inputting the first set of k coordinates to the quantization neural network to determine first quantization levels for approximating the first set of k coordinates; quantizing the vector having the dimension d based on the determined first quantization levels; and using the quantized vector in the distributed or federated learning environment.

20 Claims, 7 Drawing Sheets

(56) References Cited

OTHER PUBLICATIONS

Vargaftik, et al., “DRIVE: One-bit Distributed Mean Estimation”, Advances in Neural Information Processing Systems, Dec. 2021, vol. 34, Curran Associates, Inc.
Vargaftik, et al., “EDEN: Communication-Efficient and Robust Distributed Mean Estimation for Federated Learning”, International Conference on Machine Learning, Jan. 2022, PMLR, vol. 162.
Basat, et al., “QUIC-FL: Quick Unbiased Compression for Federated Learning”, Nov. 2022, arXiv.

* cited by examiner

LEARNING QUANTIZATION LEVELS

BACKGROUND

Applications in various fields of computer science involve processing and communicating large quantities of values, such as vectors with billions of coordinates. However, it is often impracticable to carry out operations on such large quantities of values, such as transmitting the values across a network, which requires too much bandwidth and takes too long. Two such fields in which this problem has presented itself are distributed machine learning (ML) and federated ML, referred to herein simply as distributed and federated learning.

Distributed and federated learning usually involve computation stages by a plurality of participating nodes and communication stages between those participants. During the computation stages, the participants perform a local optimization step(s) to obtain gradient updates for their local neural networks. The gradient updates each include a plurality of gradient values, e.g., stored as coordinates of a vector. Each gradient value is a value that has been used for updating a weight within a local neural network. During the communication stages, the participants exchange these gradient vectors (directly or via a global server(s)). The number of coordinates of each gradient vector corresponds to the number of nodes in a corresponding local neural network and can be as large as billions. Often, the communication stages are a bottleneck of the distributed and federated learning training procedures. Thus, reducing the number of transmitted bits between the participants is of significant importance.

One technique to reduce the number of transmitted bits during distributed and federated learning is to use quantization. Using quantization, each coordinate in a gradient vector is approximated as one of a few distinct quantization values before the gradient vector is transmitted across a network. Each of these distinct quantization values is referred to as a "level." The number of bits that are required to represent each of the levels is $\log_2(Q)$, where Q is the number of different levels. Accordingly, using quantization, the number of bits needed to represent a coordinate of a gradient vector is reduced to the size of a level, which dramatically reduces the number of bits needed to represent the entire gradient vector.

For example, applying 1-bit quantization to distributed and federated learning (i.e., approximating each coordinate of a gradient vector as one of two levels, 0 and 1) can be done as follows. For a gradient vector g with d coordinates, each coordinate $v_i$ can be quantized as $$x_i = \text{Bernoulli}\left(\frac{v_i - \min(v)}{\max(v) - \min(v)}\right),$$

where $x_i$ is the quantized value of the coordinate $v_i$ (i.e., the level that coordinate $v_i$ is approximated as), and v is the entire gradient vector. However, this technique has a high statistical variance (i.e., high dispersion) in the quantization of the coordinates, often resulting in low accuracy in approximating the values of the coordinates. In other words, the values of the original coordinates are often very different from the values of the quantized coordinates, which are thus not usable in applications.

More complex techniques have been developed for determining which levels to use for quantizing large numbers of values. These algorithms are able to determine optimal levels to apply. In other words, these algorithms are able to identify levels that, when used for approximating the values, result in quantized values which are relatively close to the original values. However, these techniques are too slow to use in real time in applications such as distributed and federated learning. Accordingly, a method for quantizing large numbers of values both accurately and efficiently is needed.

SUMMARY

Embodiments provide a method of reducing data transmission between neural networks in a distributed or federated learning environment. The method includes training a quantization neural network by using a plurality of training vectors each having a dimension k, wherein the quantization neural network is configured to, based on said training, output quantization levels for approximating input vectors having the dimension k; after training the quantization neural network, randomly sampling coordinates of a vector having a dimension d, to provide a first set of k coordinates, wherein d is greater than k, and the vector having the dimension d is generated in the distributed or federated learning environment; inputting the first set of k coordinates to the quantization neural network to determine first quantization levels for approximating the first set of k coordinates; quantizing the vector having the dimension d based on the determined first quantization levels; and using the quantized vector in the distributed or federated learning environment.

Further embodiments include a computer-readable medium containing instructions for carrying out one more aspects of the above method and a system configured to carry out one or more aspects of the above method.

DETAILED DESCRIPTION

Techniques for quantizing large numbers of values both accurately and efficiently, are described. The techniques involve training a neural network to determine optimal quantization levels for applying to a large number of values, e.g., a vector with 1 billion coordinates. The input layer of the neural network is smaller than the vector, e.g., 1 million input nodes. After the neural network is trained, the vector is randomly sampled, e.g., randomly selecting 1 million out of 1 billion coordinates. The selected coordinates are then input to the neural network, and a set of optimal levels is output by the neural network. These levels are then applied to the entire vector, i.e., not just to those that were sampled.

Because the size of the neural network is relatively small, once the neural network is trained, it can be used in real time in applications such as distributed and federated learning. Additionally, despite its size, it identifies optimal levels for quantizing the vector with high accuracy in approximating the original coordinates. This is because the optimal levels are determined based on a sample of the vector itself. As long as the distribution of the randomly sampled coordinates is similar to the distribution of the entire vector, the determined levels work well for the entire vector. It should be noted that although this invention is described herein with reference to distributed and federated learning, a person having ordinary skill in the art would recognize the applicability of this invention to other situations in which it is desirable to quantize large numbers of values, including in situations that do not involve ML. These and further aspects of the invention are discussed below with respect to the drawings.

Figure 1A:
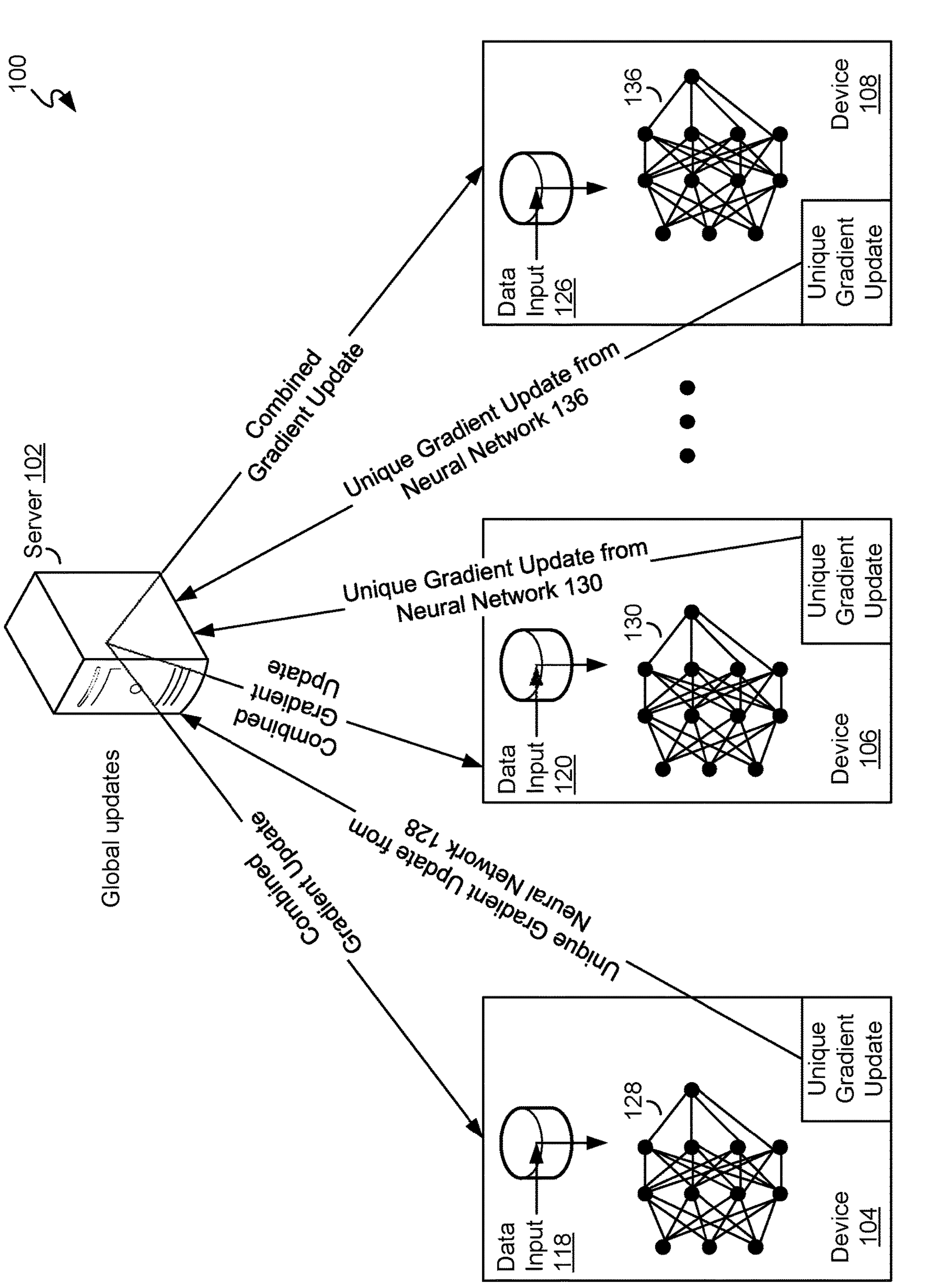
FIG. 1A depicts a computer system for distributed or federated learning using several neural networks, without the use of quantization.

FIG. 1A depicts a computer system 100 for distributed or federated learning using several neural networks, without the use of quantization. Distributed and federated learning have a plurality of neural networks which are able to learn from each other. In FIG. 1A, each of devices 104, 106, 108 includes a neural network 128, 130, 136, respectively, and data inputs 118, 120, 126, respectively, which provide the respective neural networks with data for training. For example, devices 104, 106, 108 may be personal computing devices such as desktop computers, laptops, or smartphones. Neural networks 128, 130, 136 learn from each other by having devices 104, 106, 108 connected to each other via a network (not shown), such as the public network (i.e., Internet), to which a global server 102 is also connected.

As a result of local training within each of neural networks 128, 130, 136, each neural network determines a vector of gradient values, i.e., a unique gradient update. Each gradient value is a value that has been used for updating weights within a respective neural network. Each of devices 104, 106, 108 sends a respective gradient vector to server 102, e.g., via the Internet. Server 102 combines (say by averaging) the received gradient vectors to determine a combined gradient vector, i.e., a combined gradient update. Server 102 then sends the combined (e.g., averaged) gradient vector back to devices 104, 106, 108, e.g., via the Internet.

Each local neural network alters itself upon receiving and using the combined gradient vector to change the respective local weights to become modified weights. The modified local weights then reflect the learning of each neural network participating in the distributed or federated learning. It should be noted that the gradient vectors transmitted by devices 104, 106, 108 are different from each other, but the same combined gradient vector is transmitted by server 102.

Figure 1B:
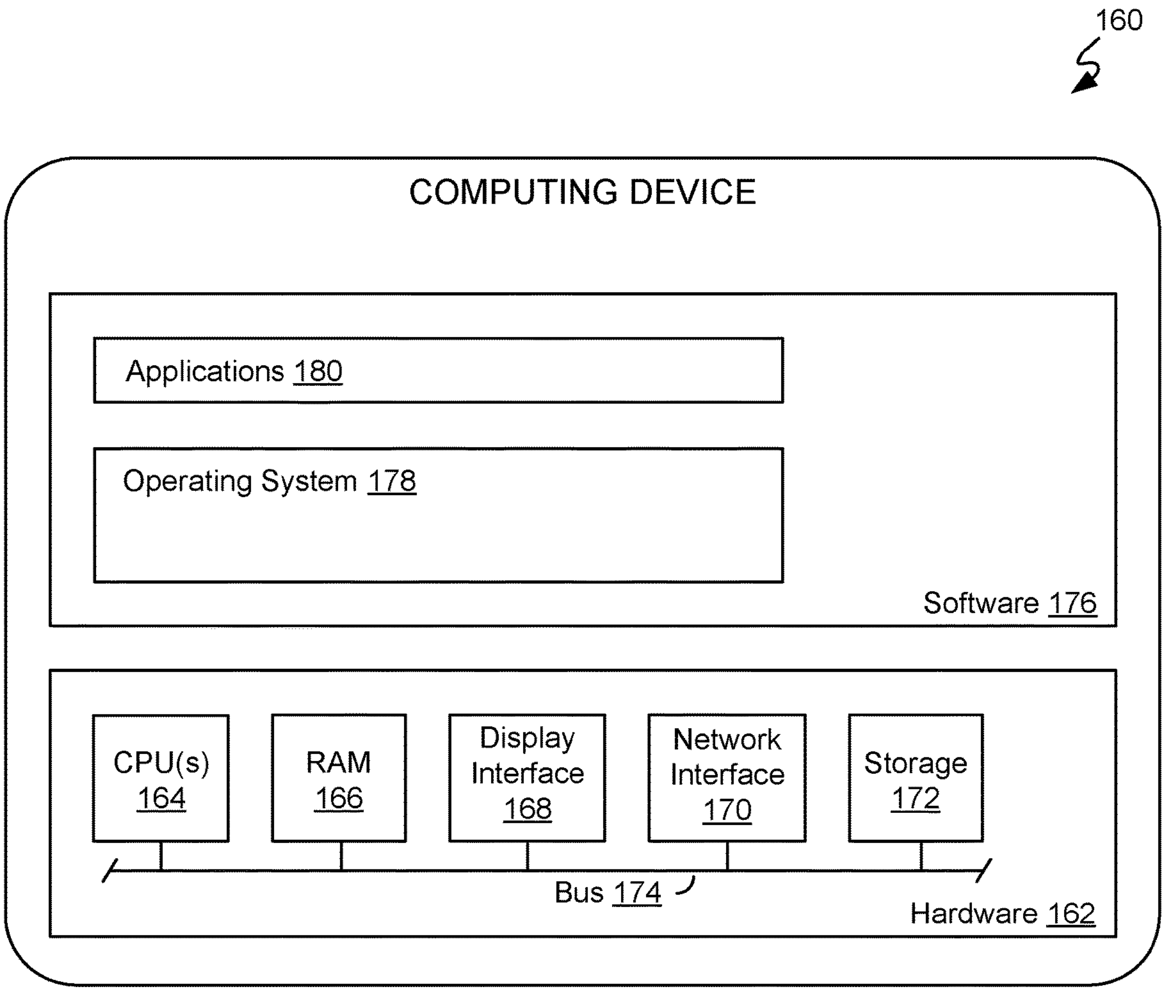
FIG. 1B depicts a representative computer device through which embodiments may operate.

FIG. 1B depicts a representative computing device 160 through which embodiments may operate. Devices 104, 106, 108, and server 102 have a configuration according to computing device 160. Computing device 160 includes hardware 162 and software 176. Hardware 162 includes one or more CPUs 164, random-access memory (RAM) 166, a display interface 168, a network interface 170, and storage 172. CPU(s) 164 are configured to execute instructions such as executable instructions that perform one or more operations described herein, which may be stored in RAM 166. Components of hardware 162 communicate with each other using a bus 174. Software 176 includes an operating system 178, such as the Linux® operating system or the Windows® operating system. Software 176 also includes applications 180 running on operating system 178.

Figure 2:
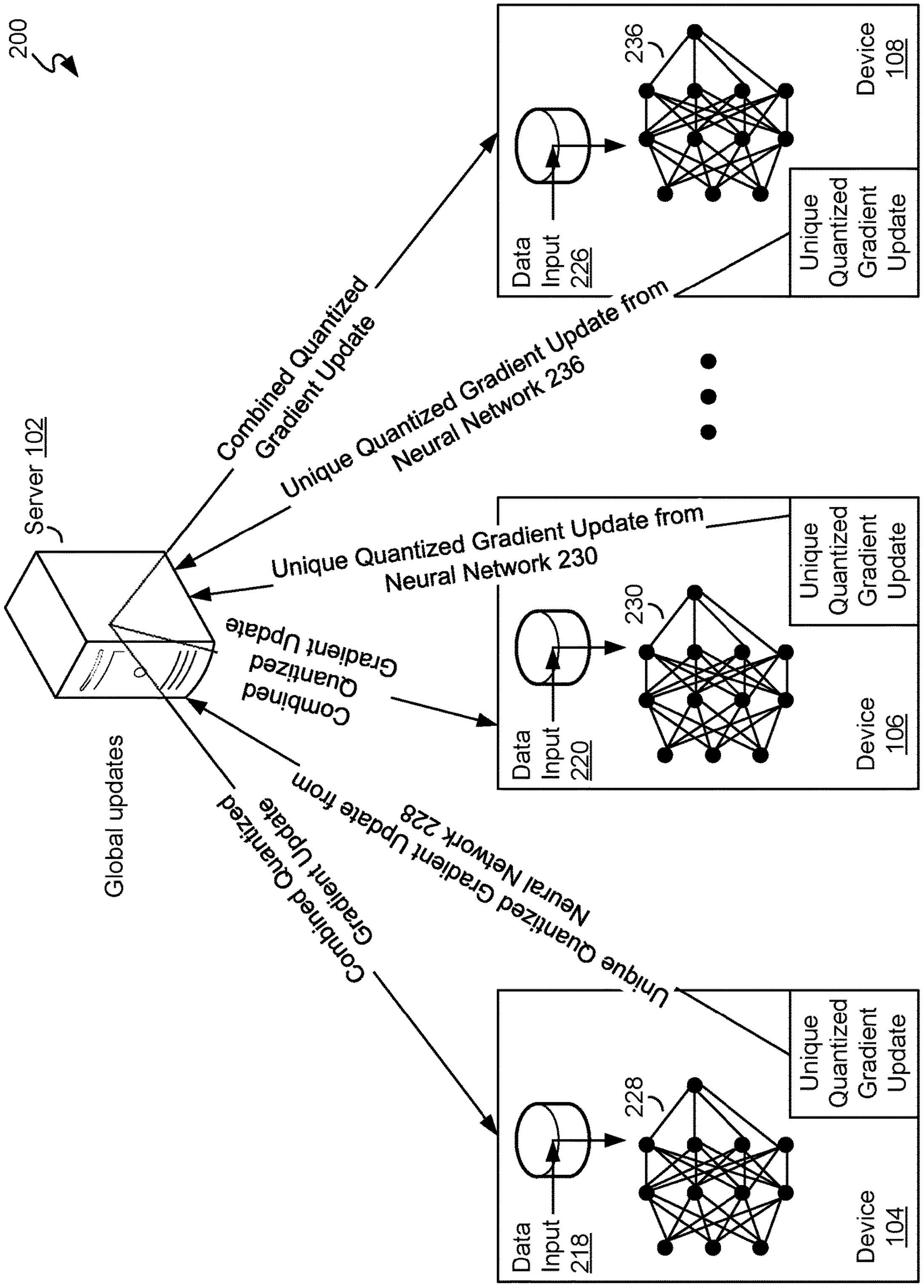
FIG. 2 depicts a computer system for distributed or federated learning using several neural networks, in an embodiment.

FIG. 2 depicts a computer system 200 for distributed or federated learning using several neural networks, in an embodiment. Items of FIG. 2 that are common with those of FIG. 1A contain the same labels and will not be described further. In FIG. 2, each of devices 104, 106, 108 includes a neural network 228, 230, 236, respectively, and data input 218, 220, 226, respectively, which provide the respective neural networks with data for training. Like neural networks 128, 130, 136 of FIG. 1A, neural networks 228, 230, 236 learn from each other.

As a result of local training within each of neural networks 228, 230, 236, each neural network determines a vector of gradient values, i.e., a unique gradient update. Each gradient value is a value that has been used for updating weights within a local neural network. Each neural network quantizes its respective gradient vector, as discussed further below in conjunction with FIG. 3, creating a unique quantized gradient update. Each of devices 104, 106, 108 then sends a respective quantized gradient vector to server 102, e.g., via the Internet. Server 102 combines (say by averaging) the received quantized gradient vectors to determine a combined quantized gradient vector, i.e., a combined quantized gradient update. Server 102 then sends the combined (e.g., averaged) quantized gradient vector back to devices 104, 106, 108, e.g., via the Internet.

Each neural network alters itself upon receiving and using the combined quantized gradient vector to change the respective local weights to become modified weights. The modified local weights then reflect the learning of each neural network participating in the distributed or federated learning. It should be noted that the quantized gradient vectors transmitted by devices 104, 106, 108 are different from each other, but the same combined quantized gradient vector is transmitted by server 102.

It should be noted that devices 104, 106, 108 may alternatively transmit respective quantized gradient vectors directly to each other for modifying the weights of the local neural networks, i.e., without transmitting the quantized gradient vectors to server 102 for combination. Additionally, although FIG. 2 illustrates quantizing gradient vectors that are transmitted from devices 104, 106, 108 to server 102, the quantization may instead be applied to combined (e.g., averaged) vectors that are transmitted from server 102 to devices 104, 106, 108. As has been described, FIG. 1A and FIG. 2 both result in neural networks of a distributed or federated learning environment, learning from each other. However, because the gradient vectors of FIG. 2 are quantized before being transmitted across network 110, the number of bits transmitted across network 110 is greatly reduced. Accordingly, the distributed or federated training illustrated by FIG. 2 requires less bandwidth than that of FIG. 1A, and is thus performed more quickly.

Figure 3:
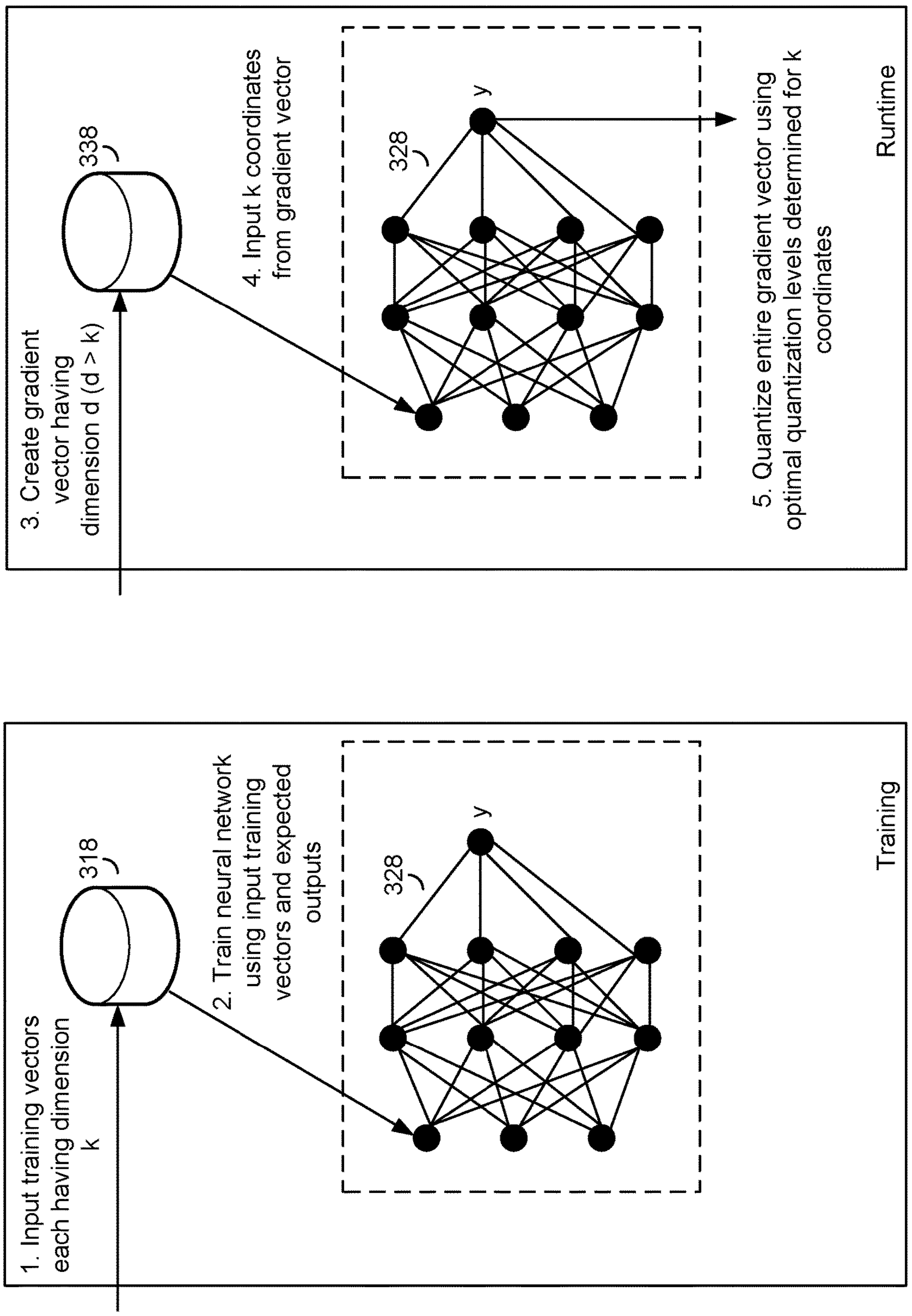
FIG. 3 depicts a conceptual diagram for training and using a neural network to determine optimal levels for quantizing gradient vectors, in an embodiment.

FIG. 3 depicts a conceptual diagram for training and using a neural network 328 to determine optimal levels for quantizing gradient vectors, in an embodiment. For example, after training, neural network 328 may run on device 104 and may quantize a gradient vector received from neural network 228 of FIG. 2. The left side of FIG. 3 illustrates training of neural network 328, and the right side illustrates the usage of neural network 328 at runtime of distributed or federated learning.

In step 1, a computing device collects a batch of input training vectors 318 for use in training neural network 328, each of training vectors 318 having a dimension k. For example, training vectors 318 may comprise 1 million training vectors, each training vector including k=1 thousand values. The computing device may also collect, for each of the training vectors, already-known optimal levels for quantizing the training vector. However, if not already known, the optimal levels for quantizing each of training vectors 318 may be determined according to various well-known methods, even through brute force.

In step 2, the computing device trains neural network 328 using training vectors 318 as inputs, and the already-known (or already-determined) optimal levels for quantization as expected outputs. During the training, each of training vectors 318 is input to neural network 328, and the actual output y of neural network 328 is compared to a corresponding expected output to determine an error. Errors between y and expected outputs are backpropagated through neural network 328 to update weights (not shown in FIG. 3) between the nodes. This backpropagation trains neural network 328 to determine optimal levels for quantizing k-dimensional vectors.

It should be noted that the number of bits that are used for each level may be specified by a user based on bandwidth constraints. The more bandwidth that is available, the more bits may be used for the levels. It should also be noted that preparing and training neural network 328 may take a long time, e.g., multiple days, especially if the expected outputs of neural network 328 for training vectors 318 must first be determined. However, the training of neural network 328 is done offline and only once.

In step 3, the computing device goes online and begins participating in a distributed or federated learning environment. As the computing device trains a separate neural network (not shown in FIG. 3), the separate neural network creates a gradient vector 338 having a dimension d that is greater than k. For example, gradient vector 338 may include d=1 billion coordinates. In step 4, the computing device randomly samples gradient vector 338, selecting k of the d coordinates, e.g., 1 million of the 1 billion coordinates. It should be noted that such selection may be pseudorandom, i.e., appearing to be random despite being deterministic. However, the term "randomly" is used herein to describe selections that may be pseudorandom. The computing device then inputs each of the k coordinates to neural network 328. Neural network 328 then outputs y as the optimal quantization levels for approximating the k coordinates.

In step 5, the computing device quantizes each coordinate of gradient vector 338 using the quantization levels output by neural network 328 (which were determined for the k coordinates). There are various methods for using the quantization levels to quantize the coordinates of gradient vector 338, including, for example, stochastic quantization and deterministic quantization. The result is a gradient vector having the dimension d, in which each coordinate has been quantized to a level. The gradient vector is thus reduced considerably in size. Although the optimal quantization levels were determined for only the k coordinates, as long as the distribution of the k coordinates is similar to that of the entire gradient vector, the d coordinates of the entire gradient vector are approximated with high accuracy.

Figure 4A:
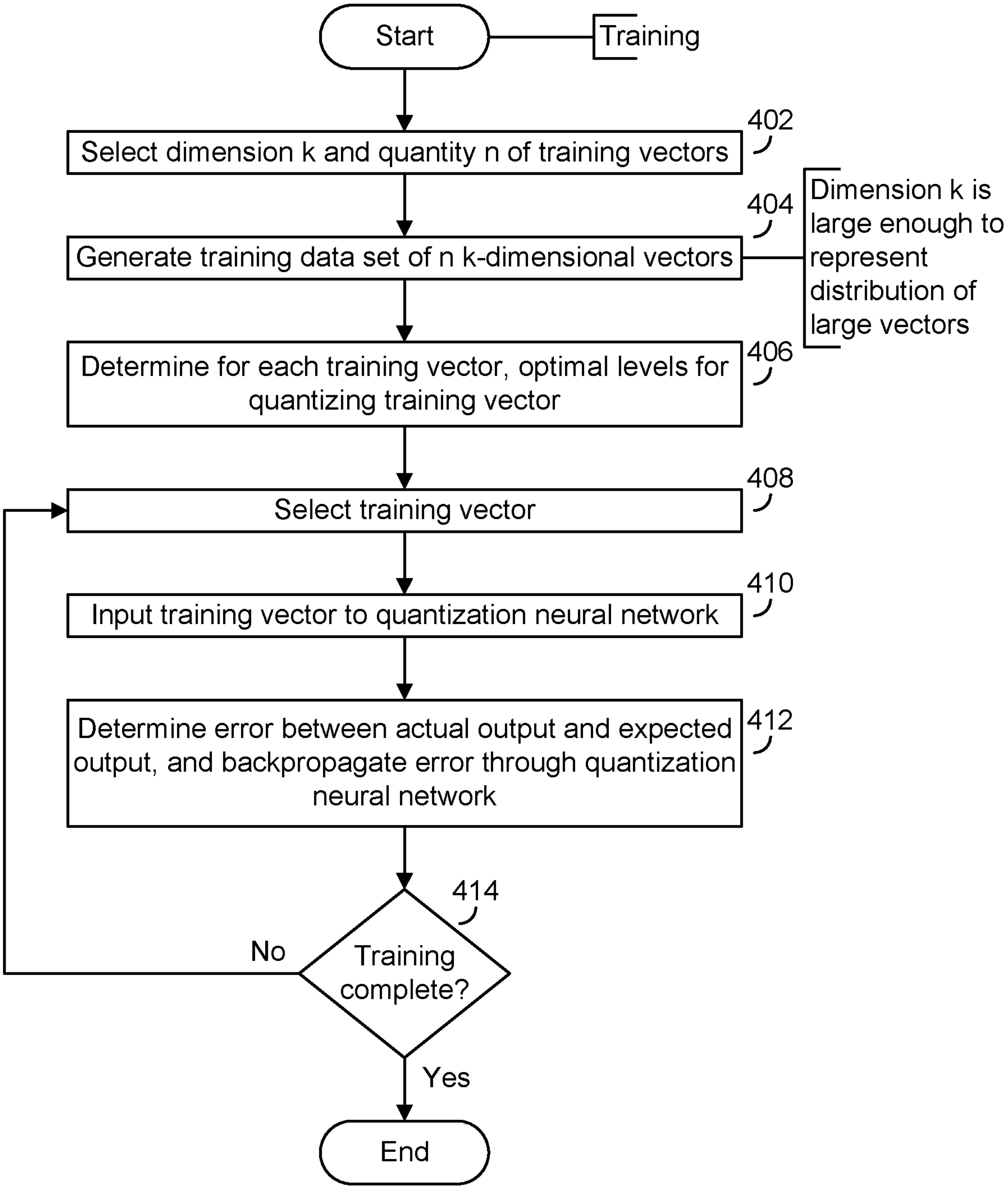
FIG. 4A depicts a flow of operations for training a neural network to determine optimal quantization levels for approximating an input data set, in an embodiment.

FIG. 4A depicts a flow of operations for training a neural network to determine optimal quantization levels for approximating an input data set. The neural network is referred to herein as a "quantization neural network." For example, the steps of FIG. 4A may be performed by one of the computing devices of FIG. 2. In step 402, a dimension size k is selected, and a quantity n of training vectors is selected. It should be noted that k is a value such as 1 million that is significantly smaller than the number of coordinates of vectors that are later reduced through quantization, e.g., gradient vectors to be reduced in a distributed or federated learning environment.

In step 404, a training data set of n k-dimensional vectors is generated. As one example, the training data set may be randomly generated. As another example, the k-dimensional vectors may each include gradient values from the training of another neural network that is participating in distributed or federated learning. It is expected that the dimension k is large enough such that if k coordinates are sampled from a larger vector, the distribution of the sampled coordinates statistically represents the distribution of the larger vector.

In step 406, optimal levels for quantizing each training vector are determined. This may be done, e.g., through brute force. The resulting optimal levels are the expected outputs (labels) during the training of the quantization neural network. In step 408, one of the training vectors is selected. In step 410, the selected training vector is input to the quantization neural network. In step 412, an error is determined between the actual output of the quantization neural network and the expected quantized output for the selected training vector. This error is backpropagated through the quantization neural network to update weights of the quantization neural network.

In step 414, if training of the quantization neural network incomplete, the flow of operations of FIG. 4A returns to step 408 to select another training vector. For example, training may be incomplete if predetermined criteria have not been met such as a minimum accuracy of prediction. The training may be performed over several rounds of using the training data set as inputs and the previously determined optimal quantization levels as expected outputs (labels). At step 414, if training of the quantization neural network is complete, the flow of operations of FIG. 4A ends. After step 414, the quantization neural network has been configured to approximate input vectors having the dimension k.

Figure 4B:
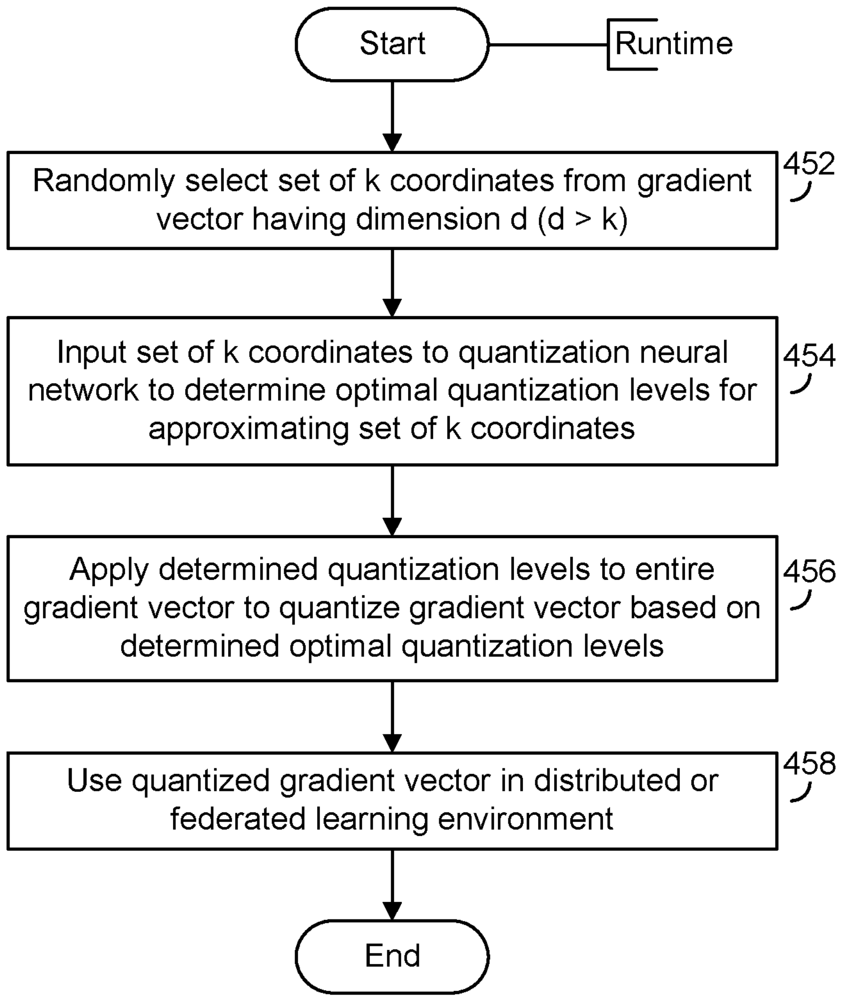
FIG. 4B depicts a flow of operations for quantizing gradient vectors of a neural network that participates in a distributed or federated learning environment, in an embodiment.

FIG. 4B depicts a flow of operations for quantizing gradient vectors of a neural network that participates in a distributed or federated learning environment, in an embodiment. For example, the steps of FIG. 4B may be performed by one of the computing devices of FIG. 2 after a quantization neural network is trained according to the steps of FIG. 4A. In step 452, a set of k coordinates from a gradient vector having dimension d, are randomly selected (sampled), d being greater than k. For example, 1 million coordinates of a gradient vector with 1 billion gradient values may be randomly selected, the gradient vector being generated during distributed or federated learning.

In step 454, the set of k coordinates is input to the quantization neural network to determine optimal quantization levels for approximating the set of k coordinates. The optimal quantization levels are output by the quantization neural network. In step 456, the optimal quantization levels are applied to the entire gradient vector to quantize the gradient vector based on the optimal quantization levels determined in step 454. For example, a user may specify stochastic quantization or deterministic quantization, and the user's specified method is applied to the coordinates of the gradient vector.

In step 458, the quantized gradient vector is used in the distributed or federated learning environment. Specifically, the quantized gradient vector is transmitted across a network to devices for the training of local neural networks of those devices. The quantized gradient vector may be transmitted directly to those devices or to a global server that forwards the quantized gradient vector to those devices. The global server may also combine the quantized gradient vector with other quantized gradient vectors transmitted by the other devices and transmit the resulting (e.g., averaged) quantized gradient vector to each participating device. The quantization may even be applied to combined (e.g., averaged) gradient vectors that are transmitted from the global server to each participating device. After step 458, the flow of operations of FIG. 4B ends.

Figure 4C:
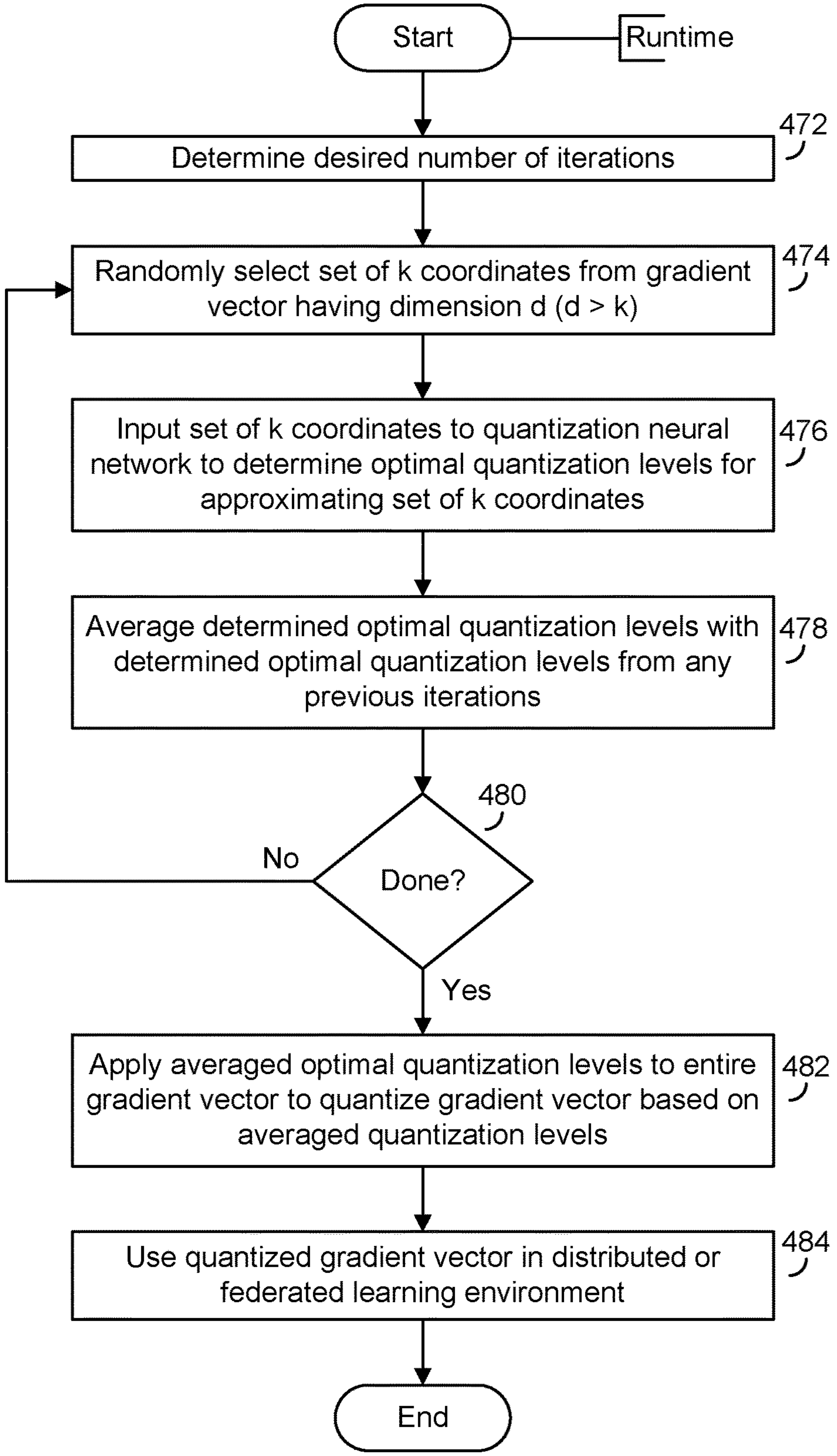
FIG. 4C depicts a flow of operations for quantizing gradient vectors of a neural network that participates in a distributed or federated learning environment, in another embodiment.

FIG. 4C depicts a flow of operations for quantizing gradient vectors of a neural network that participates in a distributed or federated learning environment, in another embodiment. For example, the steps of FIG. 4C may be performed by one of the computing devices of FIG. 2 after a quantization neural network is trained according to the steps of FIG. 4A. The embodiment of FIG. 4C may be used instead of the embodiment of FIG. 4B to increase the accuracy of quantization, through iteration. In step 472, a desired number of iterations is determined. For example, a user may specify 5 iterations. The more iterations that are specified, the more accuracy is expected in identifying optimal levels for approximating an entire gradient vector.

In step 474, a set of k coordinates from a gradient vector having dimension d, are randomly selected (sampled), d being greater than k. For example, 1 million coordinates of a gradient vector with 1 billion gradient values may be randomly selected, the gradient vector being generated during distributed or federated learning. In step 476, the set of k coordinates is input to the quantization neural network to determine optimal quantization levels for approximating the set of k coordinates. The optimal quantization levels are output by the quantization neural network. In step 478, the optimal quantization levels determined in step 476 are averaged with optimal quantization levels from any previous iterations of step 476. In step 480, if the desired number of iterations has not yet occurred, the flow of operations of FIG. 4C returns to step 474, and another k coordinates of the gradient vector are randomly selected. Otherwise, if the desired number of iterations has already occurred, the flow of operations of FIG. 4C moves to step 482.

In step 482, the averaged quantization levels are applied to the entire gradient vector to quantize the gradient vector based on the averaged quantization levels. For example, a user may specify stochastic quantization or deterministic quantization, and the user's specified method is applied to the coordinates of the gradient vector. In step 484, the quantized gradient vector is used in the distributed or federated learning environment, as described above with respect to step 458 of FIG. 4B. After step 484, the flow of operations of FIG. 4C ends.

From time to time, some coordinates of a gradient vector cannot be approximated, within a threshold, as any of a determined group of optimal quantization levels. In some embodiments, those coordinates are still approximated based on the determined optimal quantization levels. In other embodiments, those coordinates are included in a quantized vector without those coordinates being quantized. This avoids inaccurately approximating some of the coordinates, but the cost is increasing the size of the (mostly) quantized vector.

In summary, according to embodiments, vectors, such as gradient vectors of a neural network participating in a distributed or federated learning environment, are quantized. The gradient vectors are quantized according to levels output by a trained neural network. The trained neural network takes, as an input, a much smaller number of coordinates than the number of coordinates in the entire gradient vector. However, the quantized gradient vectors still statistically represent the un-quantized gradient vectors and thus can be used in distributed or federated learning environments. Using the quantized gradient vectors substantially reduces the amount of data transferred among neural networks participating in distributed or federated learning.

One or more embodiments of the present invention may be implemented as one or more computer programs or as one or more computer program modules embodied in one or more computer-readable media. The term computer-readable medium refers to any data storage device that can store data which can thereafter be input to a computer system. Computer-readable media may be based on any existing or subsequently developed technology for embodying computer programs in a manner that enables them to be read by a computer. Examples of a computer-readable medium include a hard drive, network-attached storage (NAS), read-only memory, RAM (e.g., a flash memory device), a CD (Compact Disk)—CD-ROM, CDR, or CD-RW, a DVD (Digital Versatile Disk), a magnetic tape, and other optical and non-optical data storage devices. The computer-readable medium can also be distributed over a network-coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation unless explicitly stated in the claims.

Plural instances may be provided for components, operations, or structures described herein as a single instance. Finally, boundaries between various components and operations are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of reducing data transmission for a plurality of local neural networks trained respectively by a plurality of computing devices using distributed or federated learning, the method comprising:

training a quantization neural network that is separate from the plurality of local neural networks, by using a plurality of training vectors each having a dimension k, wherein the quantization neural network is configured to output quantization levels based on said training of the quantization neural network, each of the quantization levels being a value to which vector coordinates may be approximated, and said training of the quantization neural network including backpropagating, through the quantization neural network, errors between outputs generated by the quantization neural network during said training of the quantization neural network and expected quantization levels;

after said training of the quantization neural network, randomly sampling coordinates within a gradient vector having a dimension d, to obtain a first set of k coordinates, wherein d is greater than k, and the gradient vector includes gradient values generated by a first computing device of the plurality of computing devices by training a first local neural network of the plurality of local neural networks;

inputting the first set of k coordinates to the quantization neural network, and obtaining first quantization levels as outputs generated by the quantization neural network based on the input first set of k coordinates;

quantizing the gradient vector based on the determined first quantization levels to generate a quantized gradient vector, wherein coordinates within the quantized gradient vector include different quantization levels from the first quantization levels; and using the quantized gradient vector with the different quantization levels to train at least one of the plurality of local neural networks.

2. The method of claim 1, wherein using the quantized gradient vector comprises:

transmitting, by the first computing device, the quantized gradient vector across a network to a second computing device of the plurality of computing devices; and updating, based at least on such quantized gradient vector, a second local neural network of the plurality of local neural networks trained by the second computing device.

3. The method of claim 1, further comprising:

transmitting, by each of the plurality of computing devices across a network to a global server, a respective quantized gradient vector; and generating, by the global server based on the respective quantized gradient vectors received from the plurality of computing devices, an averaged quantized gradient vector that is used to train each of the plurality of local neural networks.

4. The method of claim 1, further comprising:

after obtaining the first set of k coordinates but before quantizing the gradient vector, randomly sampling coordinates within the gradient vector again, to obtain a second set of k coordinates;

inputting the second set of k coordinates to the quantization neural network, and obtaining second quantization levels as outputs generated by the quantization neural network based on the input second set of k coordinates; and adjusting the first quantization levels based on the second quantization levels, wherein the gradient vector is quantized based on the adjusted first quantization levels.

5. The method of claim 1, further comprising:

determining that one of the coordinates within the gradient vector cannot be approximated within a threshold to one of the levels from the first quantization levels; and including, based on the one of the coordinates not being able to be approximated within the threshold, an original value of the one of the coordinates in the quantized gradient vector used to train the at least one of the plurality of local neural networks.

6. The method of claim 1, further comprising:

randomly generating the plurality of training vectors, wherein previously determined quantization levels for each of the randomly generated training vectors are used as the expected quantization levels for said training of the quantization neural network.

7. The method of claim 1, further comprising:

generating the plurality of training vectors from gradient values that were generated by one or more of the plurality of computing devices during the distributed or federated learning.

8. A system for reducing data transmission for a plurality of local neural networks trained using distributed or federated learning, the system comprising:

a plurality of computing devices respectively training the plurality of local neural networks, including a first computing device having a first memory that includes a first local neural network of the plurality of local neural networks, and a second computing device having a second memory that includes a second local neural network of the plurality of local neural networks; and a network connecting the plurality of computing devices, wherein the system is configured to:

train a quantization neural network that is separate from the plurality of local neural networks, by using a plurality of training vectors each having a dimension k, the quantization neural network being configured to output quantization levels based on said training of the quantization neural network, each of the quantization levels being a value to which vector coordinates may be approximated, and said training of the quantization neural network including backpropagating, through the quantization neural network, errors between outputs generated by the quantization neural network during said training of the quantization neural network and expected quantization levels;

after said training of the quantization neural network, randomly sample coordinates within a gradient vector having a dimension d, to obtain a first set of k coordinates, d being greater than k, and the gradient vector including gradient values generated by the first computing device by training the first local neural network;

input the first set of k coordinates to the quantization neural network, and obtain first quantization levels as outputs generated by the quantization neural network based on the input first set of k coordinates;

quantize the gradient vector based on the determined first quantization levels to generate a quantized gradient vector, coordinates within the quantized gradient vector including different quantization levels from the first quantization levels; and use the quantized gradient vector with the different quantization levels to train at least one of the plurality of local neural networks.

9. The system of claim 8, wherein using the quantized gradient vector comprises:

transmitting, by the first computing device, the quantized gradient vector across the network to the second computing device; and updating the second local neural network based at least on the quantized gradient vector.

10. The system of claim 8, further configured to:

transmit, by each of the plurality of computing devices across the network to a global server, a respective quantized gradient vector; and generate, by the global server based on the respective quantized gradient vectors received from the plurality of computing devices, an averaged quantized gradient vector that is used to train each of the plurality of local neural networks.

11. The system of claim 8, further configured to:

after obtaining the first set of k coordinates but before quantizing the gradient vector, randomly sample coordinates within the gradient vector again, to obtain a second set of k coordinates;

input the second set of k coordinates to the quantization neural network, and obtain second quantization levels as outputs generated by the quantization neural network based on the input second set of k coordinates; and adjust the first quantization levels based on the second quantization levels, wherein the gradient vector is quantized based on the adjusted first quantization levels.

12. The system of claim 8, further configured to:

determine that one of the coordinates within the gradient vector cannot be approximated within a threshold to one of the levels from the first quantization levels; and include, based on the one of the coordinates not being able to be approximated within the threshold, an original value of the one of the coordinates in the quantized gradient vector used to train the at least one of the plurality of local neural networks.

13. The system of claim 8, further configured to:

randomly generate the plurality of training vectors, wherein previously determined quantization levels for each of the randomly generated training vectors are used as the expected quantization levels for said training of the quantization neural network.

14. The system of claim 8, further configured to:

generate the plurality of training vectors from gradient values that were generated by one or more of the plurality of computing devices during the distributed or federated learning.

15. One or more non-transitory computer-readable media comprising instructions executable in a computer system, the computer system including a plurality of computing devices respectively training a plurality of local neural networks using distributed or federated learning, wherein the instructions, when executed, cause the computer system to carry out a method of reducing data transmission for the plurality of local neural networks, the method comprising:

training a quantization neural network that is separate from the plurality of local neural networks, by using a plurality of training vectors each having a dimension k, the quantization neural network being configured to output quantization levels based on said training of the quantization neural network, each of the quantization levels being a value to which vector coordinates may be approximated, and said training of the quantization neural network including backpropagating, through the quantization neural network, errors between outputs generated by the quantization neural network during said training of the quantization neural network and expected quantization levels;

after said training of the quantization neural network, randomly sampling coordinates within a gradient vector having a dimension d, to obtain a first set of k coordinates, d being greater than k, and the gradient vector including gradient values generated by a first computing device of the plurality of computing devices by training a first local neural network of the plurality of local neural networks;

inputting the first set of k coordinates to the quantization neural network, and obtaining first quantization levels as outputs generated by the quantization neural network based on the input first set of k coordinates;

quantizing the gradient vector based on the determined first quantization levels to generate a quantized gradient vector, coordinates within the quantized gradient vector including different quantization levels from the first quantization levels; and using the quantized gradient vector with the different quantization levels to train at least one of the plurality of local neural networks.

16. The one or more non-transitory computer-readable media of claim 15, wherein using the quantized gradient vector comprises:

transmitting, by the first computing device, the quantized gradient vector across a network to a second computing device of the plurality of computing devices; and updating, based at least on the quantized gradient vector, a second local neural network of the plurality of local neural networks trained by the second computing device.

17. The one or more non-transitory computer-readable media of claim 15, the method further comprising:

transmitting, by each of the plurality of computing devices across a network to a global server, a respective quantized gradient vector; and generating, by the global server based on the respective quantized gradient vectors received from the plurality of computing devices, an averaged quantized gradient vector that is used to train each of the plurality of local neural networks.

18. The one or more non-transitory computer-readable media of claim 15, the method further comprising:

after obtaining the first set of k coordinates but before quantizing the gradient vector, randomly sampling coordinates within the gradient vector again, to obtain a second set of k coordinates;

inputting the second set of k coordinates to the quantization neural network, and obtaining second quantization levels as outputs generated by the quantization neural network based on the input second set of k coordinates; and adjusting the first quantization levels on the second quantization levels, wherein the gradient vector is quantized based on the adjusted first quantization levels.

19. The one or more non-transitory computer-readable media of claim 15, the method further comprising:

determining that one of the coordinates within the gradient vector cannot be approximated within a threshold to one of the levels from the first quantization levels; and including, based on the one of the coordinates not being able to be approximated within the threshold, an original value of the one of the coordinates in the quantized gradient vector used to train the at least one of the plurality of local neural networks.

20. The one or more non-transitory computer-readable media of claim 15, the method further comprising:

randomly generating the plurality of training vectors, wherein previously determined quantization levels for each of the randomly generated training vectors are used as the expected quantization levels for said training of the quantization neural network.

* * * * *